United States Patent
He

(10) Patent No.: US 10,419,217 B2
(45) Date of Patent: Sep. 17, 2019

(54) SECURITY INFORMATION CONFIGURATION METHOD, SECURITY VERIFICATION METHOD, AND RELATED CHIP

(71) Applicant: Huawei Technologies Co., Ltd., Shenzhen, Guangdong (CN)

(72) Inventor: Guizhou He, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 235 days.

(21) Appl. No.: 15/587,746

(22) Filed: May 5, 2017

(65) Prior Publication Data
US 2017/0244562 A1 Aug. 24, 2017

Related U.S. Application Data

(63) Continuation of application No. PCT/CN2014/090480, filed on Nov. 6, 2014.

(51) Int. Cl.
| | |
|---|---|
| H04L 9/08 | (2006.01) |
| H04L 9/30 | (2006.01) |
| G06F 12/14 | (2006.01) |
| H04L 9/14 | (2006.01) |
| H04L 9/32 | (2006.01) |

(52) U.S. Cl.
CPC ........ *H04L 9/0894* (2013.01); *G06F 12/1408* (2013.01); *H04L 9/08* (2013.01);
(Continued)

(58) Field of Classification Search
CPC ... H04L 9/0894; H04L 9/3247; H04L 9/0861; H04L 9/14; H04L 9/08; H04L 9/30;
(Continued)

(56) References Cited

U.S. PATENT DOCUMENTS 5,724,425 A * 3/1998 Chang .................. G06F 21/125
380/30
6,789,189 B2 9/2004 Wheeler et al.
(Continued)

FOREIGN PATENT DOCUMENTS

| CN | 101009888 A | 8/2007 |
|---|---|---|
| CN | 101043327 A | 9/2007 |

(Continued)

OTHER PUBLICATIONS

Tonti, William R.,"eFuse Design and Reliability," 2013 IEEE International Integrated Reliability Workshop Final Report, Jun. 3, 2008, total 3 pages.

*Primary Examiner* — Mohammad W Reza
(74) *Attorney, Agent, or Firm* — Womble Bond Dickinson (US) LLP

(57) ABSTRACT

Embodiments of the present invention provide a security information configuration method, so as to reduce costs, simplify a security information configuration process, and improve security and reliability of security information configuration. The security information configuration method provided in the embodiments of the present invention includes: generating, by an SoC, an asymmetric key pair; writing a private key into an eFuse of the SoC; encrypting a public key; writing the encrypted public key into a flash memory for storage; generating first digest information according to target software information; making a signature for the first digest information, so as to obtain signature information; and writing the signature information into the flash memory. The embodiments of the present invention further provide a related security verification method and a related chip.

14 Claims, 6 Drawing Sheets

(52) U.S. Cl.
CPC .............. *H04L 9/0861* (2013.01); *H04L 9/14* (2013.01); *H04L 9/30* (2013.01); *H04L 9/3247* (2013.01); *G06F 2212/1052* (2013.01); *G06F 2212/2022* (2013.01); *G06F 2212/402* (2013.01)

(58) Field of Classification Search
CPC ......... G06F 12/1408; G06F 2212/1052; G06F 2212/2022; G06F 2212/402
USPC ........................................................ 380/286
See application file for complete search history.

(56) References Cited

U.S. PATENT DOCUMENTS

| | | | |
|---|---|---|---|
| 2005/0005098 A1* | 1/2005 | Michaelis | G06F 21/121 713/156 |
| 2006/0117177 A1 | 6/2006 | Buer | |
| 2006/0130154 A1* | 6/2006 | Lam | G06F 21/64 726/30 |
| 2007/0083760 A1 | 4/2007 | Cho et al. | |
| 2008/0165952 A1 | 7/2008 | Smith et al. | |
| 2009/0024784 A1 | 1/2009 | Wang et al. | |
| 2011/0087872 A1* | 4/2011 | Shah | H04L 9/3236 713/2 |
| 2012/0079287 A1 | 3/2012 | Leclercq | |

FOREIGN PATENT DOCUMENTS

| | | |
|---|---|---|
| CN | 101159715 A | 4/2008 |
| CN | 101349997 A | 1/2009 |
| CN | 101578609 A | 11/2009 |
| CN | 102147884 A | 8/2011 |
| CN | 103617394 A | 3/2014 |
| WO | 2011119985 A2 | 9/2011 |

\* cited by examiner

SECURITY INFORMATION CONFIGURATION METHOD, SECURITY VERIFICATION METHOD, AND RELATED CHIP

CROSS-REFERENCE TO RELATED APPLICATIONS

This application is a continuation of International Application No. PCT/CN2014/090480, filed on Nov. 6, 2014, the disclosure of which is hereby incorporated by reference in its entirety.

TECHNICAL FIELD

The present invention relates to the field of information security, and in particular, to a security information configuration method, a security verification method, and a related chip.

BACKGROUND

With development of information technologies, importance of information security attracts increasing attention. In a conventional information system, information such as a key or an authorization message is stored in a disk, but the disk is easy to be damaged. Consequently, security of this method is low. Therefore, in an existing information system, in addition to a flash memory (flash) and a processor, a security chip is added to protect system security. Refer to FIG. 1.

The security chip has functions such as reliability authentication, user identity authentication, and digital signature, and may be used to prevent unauthorized software modification. The security chip is a lowest security verification level for an information system. An intruder may crack the information system only after cracking the security chip. Therefore, the security chip provides a trusted basis for the entire information system.

However, all security management tasks in the existing information system are implemented by the security chip. Therefore, a security chip needs to be purchased to implement security information configuration for the information system; however, purchasing a security chip increases costs of an information system. In addition, when the security information configuration is being performed, three pieces of hardware need to be configured: the flash memory, the security chip, and the processor. Consequently, a security information configuration process is relatively complex. In addition, because the external security chip and the processor are connected by using the Ethernet, the connection between the security chip and the processor may have security vulnerability, and the information system may still be cracked by the intruder.

SUMMARY

Embodiments of the present invention provide a security information configuration method, so as to improve security of an information system and reduce a probability that an information system is cracked by an intruder.

A first aspect of the embodiments of the present invention provides a security information configuration method, including:

generating, by a system on chip SoC, an asymmetric key pair, where the asymmetric key pair includes a public key and a private key;

writing, by the SoC, the private key into an electrically programmable fuse eFuse of the SoC;

encrypting, by the SoC, the public key;

writing, by the SoC, the encrypted public key into a flash memory for storage;

obtaining, by the SoC, target software information from the flash memory, and generating first digest information according to the target software information, where the target software information is used to start target software;

using, by the SoC, the public key or the private key to make a signature for the first digest information, so as to obtain signature information; and writing, by the SoC, the signature information into the flash memory.

With reference to the first aspect of the embodiments of the present invention, in a first implementation manner of the first aspect of the embodiments of the present invention, the using, by the SoC, the public key or the private key to make a signature for the first digest information including:

obtaining, by the SoC, the encrypted public key from the flash memory;

decrypting, by the SoC, the encrypted public key, so as to obtain the public key; and using, by the SoC, the public key to make a signature for the first digest information; or using, by the SoC, the private key to make a signature for the first digest information.

With reference to the first aspect of the embodiments of the present invention, in a second implementation manner of the first aspect of the embodiments of the present invention, the eFuse includes a security identifier, where the security identifier includes two statuses: a secure state and an insecure state, and the security identifier is used to control a manner of starting the target software, where: if the security identifier indicates the insecure state, the manner of starting the target software is: direct starting; or if the security identifier indicates the secure state, the manner of starting the target software is: starting after the SoC performs security verification on the target software; and after the writing, by the SoC, the signature information into the flash memory, the method further includes:

switching, by the SoC, the security identifier of the eFuse from the insecure state to the secure state.

With reference to any one of the first aspect of the embodiments of the present invention, or the first to the second implementation manners of the first aspect, in a third implementation manner of the second aspect of the embodiments of the present invention, the encrypting, by the SoC, the public key includes:

determining, by the SoC, a symmetric key according to the private key, and encrypting the public key by using the symmetric key.

With reference to the third implementation manner of the first aspect of the embodiments of the present invention, in a fourth implementation manner of the first aspect of the embodiments of the present invention, the determining, by the SoC, a symmetric key according to the private key includes:

intercepting, by the SoC, a preset bit field of the private key as the symmetric key.

A second aspect of the embodiments of the present invention provides a security verification method, where the security verification method is applied to a system on chip SoC, and the SoC includes an electrically programmable fuse eFuse into which a private key in an asymmetric key pair is written; and the security verification method includes:

obtaining, by the SoC, signature information of target software information from the flash memory;

using, by the SoC, a public key or the private key in the asymmetric key pair to decrypt the signature information, so as to obtain first digest information;

obtaining, by the SoC, the target software information from the flash memory, and generating second digest information according to the target software information; and if the first digest information and the second digest information are the same, confirming, by the SoC, that security verification of the target software succeeds.

With reference to the second aspect of the embodiments of the present invention, in a first implementation manner of the second aspect of the embodiments of the present invention, the decrypting, by the SoC, the signature information includes:

using, by the SoC, the private key to decrypt the signature information; or obtaining, by the SoC, the encrypted public key in the asymmetric key pair from the flash memory;

decrypting, by the SoC, the encrypted public key, so as to obtain the public key; and using, by the SoC, the public key to decrypt the signature information.

With reference to the first implementation manner of the second aspect of the embodiments of the present invention, in a second implementation manner of the second aspect of the embodiments of the present invention, the decrypting, by the SoC, the encrypted public key, so as to obtain the public key includes:

determining, by the SoC, a symmetric key according to the private key, and decrypting the encrypted public key by using the symmetric key.

With reference to the second implementation manner of the second aspect of the embodiments of the present invention, in a third implementation manner of the second aspect of the embodiments of the present invention, the determining, by the SoC, a symmetric key according to the private key includes:

intercepting, by the SoC, a preset field of the private key as the symmetric key.

A third aspect of the embodiments of the present invention provides a system on chip SoC, including:

a key generation module, configured to generate an asymmetric key pair, where the asymmetric key pair includes a public key and a private key;

a private key storage module, configured to write the private key into an electrically programmable fuse eFuse of the SoC;

a public key encryption module, configured to encrypt the public key;

a public key storage module, configured to write the encrypted public key into a flash memory for storage;

a first digest generation module, configured to obtain target software information from the flash memory, and generate first digest information according to the target software information, where the target software information is used to start target software;

a first digest signature module, configured to use the public key or the private key to make a signature for the first digest information, so as to obtain signature information; and a signature storage module, configured to write the signature information into the flash memory.

With reference to the third aspect of the embodiments of the present invention, in a first implementation manner of the third aspect of the embodiments of the present invention, the first digest signature module is specifically configured to:

obtain the encrypted public key from the flash memory;

decrypt the encrypted public key, so as to obtain the public key; and use the public key to make a signature for the first digest information; or use the private key to make a signature for the first digest information.

With reference to the first implementation manner of the third aspect of the embodiments of the present invention, in a second implementation manner of the third aspect of the embodiments of the present invention, the eFuse includes a security identifier, where the security identifier includes two statuses: a secure state and an insecure state, and the security identifier is used to control a manner of starting the target software, where: if the security identifier indicates the insecure state, the manner of starting the target software is: direct starting; or if the security identifier indicates the secure state, the manner of starting the target software is: starting after the SoC performs security verification on the target software; and the SoC further includes:

a state switching module, configured to switch the security identifier of the eFuse from the insecure state to the secure state.

With reference to any one of the third aspect of the embodiments of the present invention, or the first to the second implementation manners of the third aspect, in a third implementation manner of the third aspect of the embodiments of the present invention, the public key encryption module is specifically configured to:

determine a symmetric key according to the private key, and encrypt the public key by using the symmetric key.

With reference to the third implementation manner of the third aspect of the embodiments of the present invention, in a fourth implementation manner of the third aspect of the embodiments of the present invention, the determining a symmetric key according to the private key includes:

intercepting a preset bit field of the private key as the symmetric key.

A fourth aspect of the embodiments of the present invention provides an SoC, where the SoC includes an electrically programmable fuse eFuse into which a private key in an asymmetric key pair is written, and the SoC includes:

a signature obtaining module, configured to obtain signature information of target software information from the flash memory;

a signature decryption module, configured to use a public key or the private key in the asymmetric key pair to decrypt the signature information, so as to obtain first digest information;

a second digest generation module, configured to obtain the target software information from the flash memory, and generate second digest information according to the target software information; and a security determining module, configured to: when the first digest information and the second digest information are the same, confirm that security verification of the target software succeeds.

With reference to the fourth aspect of the embodiments of the present invention, in a first implementation manner of the fourth aspect of the embodiments of the present invention, the signature decryption module is specifically configured to:

use the private key to decrypt the signature information; or obtain the encrypted public key in the asymmetric key pair from the flash memory;

decrypt the encrypted public key, so as to obtain the public key; and use the public key to decrypt the signature information.

With reference to the first implementation manner of the fourth aspect of the embodiments of the present invention, in a second implementation manner of the fourth aspect of the embodiments of the present invention, the decrypting the encrypted public key, so as to obtain the public key includes:

determining a symmetric key according to the private key, and decrypting the encrypted public key by using the symmetric key.

With reference to the second implementation manner of the fourth aspect of the embodiments of the present invention, in a third implementation manner of the fourth aspect of the embodiments of the present invention, the determining a symmetric key according to the private key includes:

intercepting a preset bit field of the private key as the symmetric key.

A fifth aspect of the embodiments of the present invention provides an SoC, including an input apparatus, an output apparatus, a processor, and a memory, where the processor is configured to perform, by invoking an operation instruction stored in the memory, the following steps:

generating an asymmetric key pair, where the asymmetric key pair includes a public key and a private key;

writing the private key into an electrically programmable fuse eFuse of the SoC;

encrypting the public key;

writing the encrypted public key into a flash memory for storage;

obtaining target software information from the flash memory, and generating first digest information according to the target software information, where the target software information is used to start target software;

using the public key or the private key to make a signature for the first digest information, so as to obtain signature information; and writing the signature information into the flash memory.

With reference to the fifth aspect of the embodiments of the present invention, in a first implementation manner of the fifth aspect of the embodiments of the present invention, the processor is further configured to:

obtain the encrypted public key from the flash memory;

decrypt the encrypted public key, so as to obtain the public key; and use the public key to make a signature for the first digest information; or use the private key to make a signature for the first digest information.

With reference to the first implementation manner of the fifth aspect of the embodiments of the present invention, in a second implementation manner of the fifth aspect of the embodiments of the present invention, the eFuse includes a security identifier, where the security identifier includes two statuses: a secure state and an insecure state, and the security identifier is used to control a manner of starting the target software, where: if the security identifier indicates the insecure state, the manner of starting the target software is: direct starting; or if the security identifier indicates the secure state, the manner of starting the target software is: starting after the SoC performs security verification on the target software; and the processor is further configured to:

switch the security identifier of the eFuse from the insecure state to the secure state.

With reference to any one of the fifth aspect of the embodiments of the present invention, or the first to the second implementation manners of the fifth aspect, in a third implementation manner of the fifth aspect of the embodiments of the present invention, the processor is further configured to:

determine a symmetric key according to the private key, and encrypt the public key by using the symmetric key.

With reference to the third implementation manner of the fifth aspect of the embodiments of the present invention, in a fourth implementation manner of the fifth aspect of the embodiments of the present invention, the processor is further configured to:

intercept a preset bit field of the private key as the symmetric key.

A sixth aspect of the embodiments of the present invention provides an SoC, including an input apparatus, an output apparatus, a processor, a memory, and an electrically programmable fuse eFuse into which a private key in an asymmetric key pair is written, where the processor is configured to perform, by invoking an operation instruction stored in the memory, the following steps:

obtaining signature information of target software information from the flash memory;

using a public key or the private key in the asymmetric key pair to decrypt the signature information, so as to obtain first digest information;

obtaining the target software information from the flash memory, and generating second digest information according to the target software information; and if the first digest information and the second digest information are the same, confirming that security verification of the target software succeeds.

With reference to the sixth aspect of the embodiments of the present invention, in a first implementation manner of the sixth aspect of the embodiments of the present invention, the processor is further configured to:

use the private key to decrypt the signature information; or obtain the encrypted public key in the asymmetric key pair from the flash memory;

decrypt the encrypted public key, so as to obtain the public key; and use the public key to decrypt the signature information.

With reference to the first implementation manner of the sixth aspect of the embodiments of the present invention, in a second implementation manner of the sixth aspect of the embodiments of the present invention, the processor is further configured to:

determine a symmetric key according to the private key, and decrypt the encrypted public key by using the symmetric key.

With reference to the second implementation manner of the sixth aspect of the embodiments of the present invention, in a third implementation manner of the sixth aspect of the embodiments of the present invention, the processor is further configured to:

intercept a preset bit field of the private key as the symmetric key.

In the embodiments of the present invention, a system on chip (SoC) generates an asymmetric key pair; writes a private key into an electrically programmable fuse (eFuse) of the SoC; encrypts a public key; writes the encrypted public key into a flash memory for storage; generates first digest information according to target software information; makes a signature for the first digest information, so as to obtain signature information; and writes the signature information into the flash memory. It may be learned from the foregoing process that in the embodiments of the present invention, a security chip is not included, and security information configuration of an information system is implemented by a built-in SoC in a processor. Because no security chip needs to be used in the embodiments of the present invention, costs of purchasing the security chip are reduced. In addition, when security configuration is being performed, only the flash memory and the SoC need to be configured, thereby simplifying a process of the security configuration. In addition, because the SoC responsible for security management is located in the processor, security information in the SoC, such as the private key, cannot be learned from outside the processor. Therefore, compared with an external security chip in the prior art, the SoC provided in the embodiments of the present invention has higher security, thereby reducing a probability that an information system is cracked by an intruder.

DETAILED DESCRIPTION

An embodiment of the present invention provides a security information configuration method, so as to improve security of an information system. The present invention further provides a security verification method and a related apparatus. The method and the apparatus are separately described below.

Figure 1:
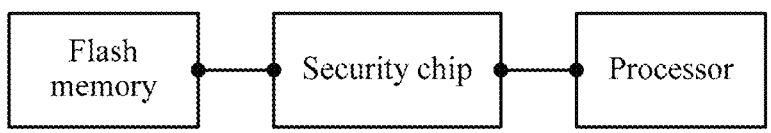
FIG. 1 is a structural diagram of an information system in the prior art.
Figure 2:
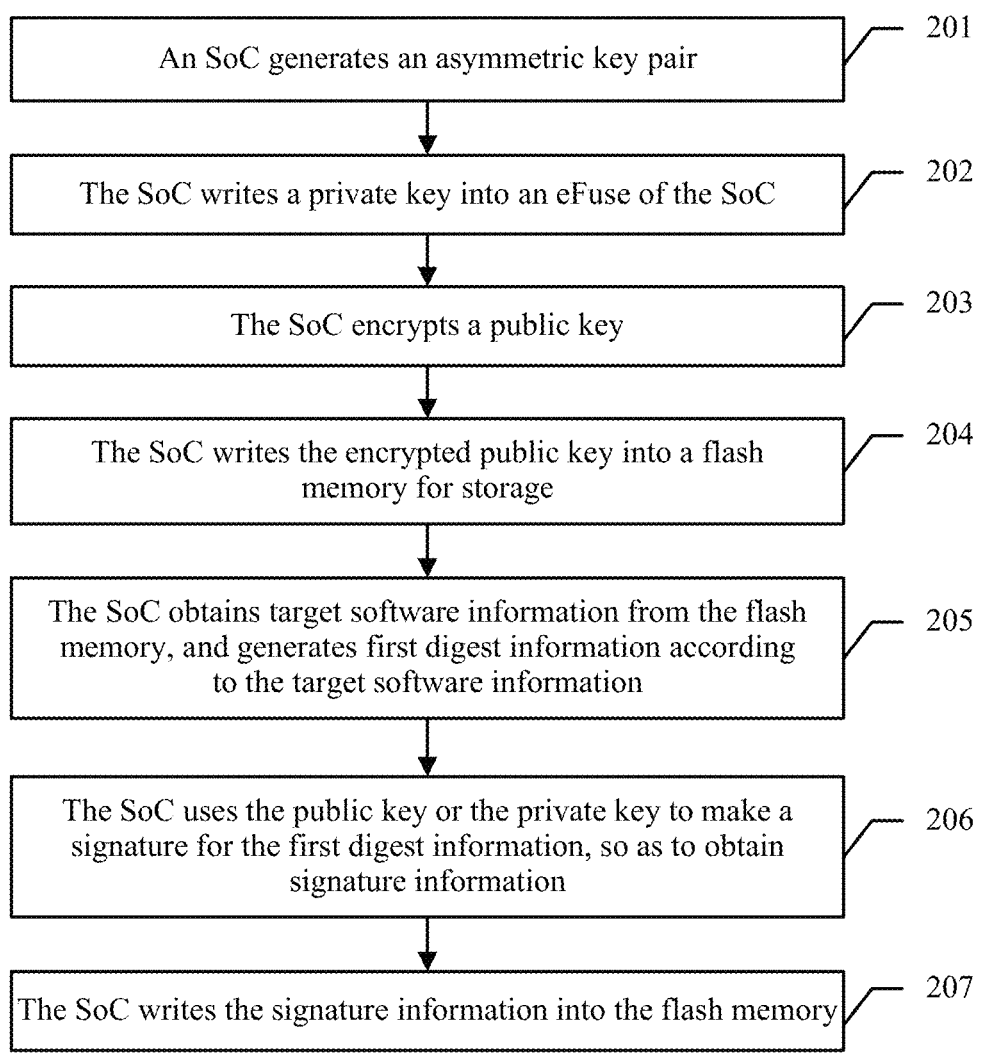
FIG. 2 is a flowchart of a security information configuration method according to an embodiment of the present invention.

For a basic process of the security information configuration method provided in an embodiment of the present invention, refer to FIG. 2. The method includes the following steps.

201. An SoC generates an asymmetric key pair.

The SoC is a converged product that emerges to adapt to a current situation of industrial automation. Technologies used in the SoC are mature technologies that are widely used in an industrial field, but the SoC is not a simple mixture of existing technologies. The SoC is a new integrated controller formed by performing packaging, interfacing, and integration on multiple practical technologies. The SoC is generally located in a processor, or replaces a processor to perform data processing in an information system.

When security information configuration is being performed on target software, the SoC generates an asymmetric key pair, which is used to perform security management on target software information. The asymmetric key pair includes a public key and a private key.

The SoC may generate the public key and the private key by using an RSA authentication algorithm, or may generate the public key and the private key by using another algorithm. This is not limited in this embodiment.

For the target software, the SoC generates a unique asymmetric key pair, which is used to perform security management only on the target software information. This ensures uniqueness of the public key and the private key, thereby ensuring that the public key and the private key cannot be easily learned by malicious software and improving security of an information system.

202. The SoC writes a private key into an eFuse of the SoC.

The eFuse is an electrically programmable fuse, and is characterized by a small volume, low costs, strong contractility, being configurable after being packaged, and the like. In this embodiment, an eFuse is provided in the SoC. The SoC writes the private key into the eFuse, thereby ensuring that the private key cannot be learned from outside the SoC.

203. The SoC encrypts a public key.

In this embodiment, the SoC needs to write the public key into a flash memory. After the public key is written into the flash memory, the public key may be learned from outside the SoC. To ensure security of the public key, before writing the public key into the flash memory, the SoC needs to encrypt the public key.

The SoC may encrypt the public key by using multiple methods, and details are described in the following embodiments. This is not limited in this embodiment.

204. The SoC writes the encrypted public key into a flash memory for storage.

After encrypting the public key, the SoC writes the encrypted public key into the flash memory for storage. In this way, even if the encrypted public key in the flash memory is obtained from outside the SoC, the public key can be learned only after the encrypted public key is cracked. Therefore, security of the information system is relatively high.

205. The SoC obtains target software information from the flash memory, and generates first digest information according to the target software information.

The target software information is stored in the flash memory, and is used to start the target software. In essence, performing security information configuration on the target software by the SoC is to ensure that it can be confirmed, when the target software is being started, that the target software information is not tampered with. To achieve this purpose, in this embodiment, a message digest (Message Digest) method is used to ensure that the target software information is not tampered with. A basic principle of the message digest method is as follows:

A digest corresponding to a character string may be obtained by processing the information by using a unidirectional hash (Hash) encryption function or another algorithm. A digest is unique, that is, digests corresponding to same messages are definitely the same, and digests corresponding to different messages are definitely different. Therefore, in this embodiment, a first digest is generated according to target software information obtained during the security information configuration; and then a second digest is generated according to target software information obtained when target software is to be started. It may be learned, by comparing whether the first digest and the second digest are the same, whether the target software information is tampered with within a time period from a moment at which the security information configuration is performed to a moment at which the target software is started.

Therefore, in this step, the SoC obtains the target software information from the flash memory, and generates the first digest information according to the target software information.

After obtaining the target software information, the SoC may temporarily store the target software information, so that the target software information can be processed by the SoC. Specifically, the SoC may load the target software information into a static random access memory (SRAM, Static RAM) in the SoC for temporary storage, or load the target software information into a double data rate synchronous dynamic random access memory (DDR, Double Data Rate) for temporary storage. This is not limited in this embodiment.

Step 205 may be performed before any step in steps 201 to 204. This is not limited in this embodiment.

206. The SoC uses the public key or the private key to make a signature for the first digest information, so as to obtain signature information.

If the first digest information is directly written into the flash memory, an intruder outside the SoC may learn and tamper with the first digest information. To ensure security of the first digest information and reliability of the message digest method, the SoC needs to make a signature for the first digest information, so as to obtain the signature information.

An asymmetric key pair is generated by the SoC in step 201. The SoC may use the public key or the private key in the asymmetric key pair to make a signature for the first digest information. The SoC may make a signature for the first digest information by using either the public key or the private key. A specific method is described in detail in the following embodiments. This is not limited in this embodiment.

After the SoC obtains the signature information by making a signature for the first digest information, if an intruder outside the SoC cannot crack the signature information, the intruder cannot tamper with the first digest information. Therefore, security of the information system is relatively high.

207. The SoC writes the signature information into the flash memory.

After obtaining the signature information by making a signature for the first digest information, the SoC writes the signature information into the flash memory. The signature information is used to confirm, when the target software is being started, that the target software information is not tampered with.

This embodiment provides a security information configuration method, including: generating an asymmetric key pair; writing a private key into an eFuse of an SoC; encrypting a public key; writing the encrypted public key into a flash memory for storage; generating first digest information according to target software information; making a signature for the first digest information, so as to obtain signature information; and writing the signature information into the flash memory. It may be learned from the foregoing process that in this embodiment of the present invention, a security chip is not included, and security information configuration of an information system is implemented by a built-in SoC in a processor. Because no security chip needs to be used in this embodiment, costs of purchasing the security chip are reduced. In addition, when security configuration is being performed, only the flash memory and the SoC need to be configured, thereby simplifying a process of the security configuration. In addition, because the SoC responsible for security management is located in the processor, security information in the SoC, such as the private key, cannot be learned from outside the processor. Therefore, compared with an external security chip in the prior art, the SoC provided in this embodiment of the present invention has higher security, thereby reducing a probability that an information system is cracked by an intruder.

An embodiment shown in FIG. 2 provides a basic process of a security information configuration method provided in the embodiments of the present invention. The following embodiment provides a more detailed security information configuration method. For basic steps of the method, refer to FIG. 3. The method mainly includes the following steps.

301. An SoC generates an asymmetric key pair.

302. The SoC writes a private key into an eFuse of the SoC.

Steps 301 and 302 are basically the same as steps 201 and 202. Details are not described in this embodiment.

303. The SoC encrypts a public key.

In this embodiment, the SoC needs to write the public key into a flash memory. After the public key is written into the flash memory, the public key may be learned from outside the SoC. To ensure security of the public key, before writing the public key into the flash memory, the SoC needs to encrypt the public key. If the public key needs to be used in a subsequent security configuration or security verification process, the SoC can obtain the public key by performing corresponding decryption operation on the encrypted public key.

The SoC may encrypt the public key by using multiple methods. This is not limited in this embodiment. The SoC may determine a symmetric key according to the private key, and encrypt the public key by using the symmetric key. Because the private key cannot be learned from outside the SoC, the symmetric key generated according to the private key may be learned only by the SoC, and cannot be cracked from outside the SoC. Therefore, security of the public key is improved.

Because the private key includes a very large quantity of bits, to simplify an operation of encrypting the public key and alleviate load on the SoC, the SoC may directly intercept a preset bit field of the private key as the symmetric key, for example, the SoC intercepts a preset least significant bit or a preset most significant bit of the private key; alternatively, the SoC may intercept a preset bit field of the private key by using another method. This is not limited herein.

Certainly, the SoC may also generate, by using an exclusive OR algorithm or another algorithm, the symmetric key according to the private key. This is not limited in this embodiment.

The SoC may perform operations in this step, such as determining the symmetric key and encrypting the public key, by using a security engine (SEC, Security Engine), or may perform the operations in this step by using another component. This is not limited herein.

304. The SoC writes the encrypted public key into a flash memory for storage.

305. The SoC obtains target software information from the flash memory, and generates first digest information according to the target software information.

Steps 304 and 305 are basically the same as steps 204 and 205. Details are not described in this embodiment.

Step 305 may be performed before any step in steps 301 to 304. This is not limited in this embodiment.

306. The SoC uses the public key or the private key to make a signature for the first digest information, so as to obtain signature information.

If the first digest information is directly written into the flash memory, the first digest information may be learned and tampered with by an intruder outside the SoC. To ensure security of the first digest information and reliability of the message digest method, the SoC needs to make a signature for the first digest information, so as to obtain the signature information.

An asymmetric key pair is generated by the SoC in step 301. The SoC may use the public key or the private key in the asymmetric key pair to make a signature for the first digest information. The SoC may make a signature for the first digest information by using either the public key or the private key. This is not limited in this embodiment.

Because the public key is stored in the flash memory after being encrypted, if the SoC uses the public key to make a signature for the first digest information, the SoC needs to obtain the encrypted public key from the flash memory; decrypt the encrypted public key, so as to obtain the public key; and then use the public key to make a signature for the first digest information.

Because the private key is written into the eFuse of the SoC, the SoC may directly use the private key to make a signature for the first digest information.

After the SoC obtains the signature information by making a signature for the first digest information, if an intruder outside the SoC cannot crack the signature information, the intruder cannot tamper with the first digest information. Therefore, security of the information system is relatively high.

307. The SoC writes the signature information into the flash memory.

After obtaining the signature information by making a signature for the first digest information, the SoC writes the signature information into the flash memory. The signature information is used to confirm, when the target software is being started, that the target software information is not tampered with.

308. The SoC switches a security identifier of the eFuse from an insecure state to a secure state.

In this embodiment, the eFuse includes a security identifier. The security identifier includes two statuses: a secure state and an insecure state. The security identifier is used to control a manner of starting the target software. If the security identifier indicates the insecure state, the target software is directly started, and the SoC does not need to perform security verification on the target software. Because in this starting manner, security verification is not performed, it cannot be ensured that the target software information is not tampered with. Therefore, security is not high. If the security identifier indicates the secure state, the target software can be started only after the SoC performs the security verification on the target software. According to this starting manner, it can be ensured that the target software information is not tampered with. Therefore, security is relatively high.

The security identifier may be a bit in the eFuse. When the bit is 1, the bit may be used to indicate the secure state; or when the bit is 0, the bit may be used to indicate the insecure state. Certainly, the secure state and the insecure state may also be indicated by using a security identifier of the eFuse in another form, such as in a form of two preset integers or in another form. This is not limited in this embodiment.

In this embodiment, after the SoC writes the signature information into the flash memory, the SoC completes the security information configuration. The security verification may be performed when the target software is being started. Therefore, the SoC switches the security identifier of the eFuse from the insecure state to the secure state, so that the target software can be started only after the SoC performs the security verification on the target software, thereby ensuring security of an information system. A method for performing the security verification by the SoC is described in detail in the following embodiments. This is not limited in this embodiment.

In actual application, a user may need to start multiple levels of target software to obtain a service. The SoC may implement security information configuration for the multiple levels of target software according to the method provided in this embodiment. For example, if a user intends to start a game "Fruit Slice" on a terminal, first-level target software, that is, a terminal underlying system, needs to be first started on the terminal; then second-level target software, that is, an Android operating system, is started by using the terminal underlying system; and finally third-level target software, that is, the game "Fruit Slice", is started by using the Android operating system. Therefore, when the security information configuration is being performed, the SoC may generate first digest information and signature information that are of target software of each level in the three levels of target software, and store signature information of target software of each level in the flash memory. In this way, when the security verification is being performed, the SoC may use the first digest information of target software of each level to perform security verification. Security configuration on the multiple levels of target software helps prevent the target software information of each level from being arbitrarily modified, thereby improving security of the information system.

This embodiment provides a security information configuration method, including: generating an asymmetric key pair; writing a private key into an eFuse of an SoC; encrypting a public key; writing the encrypted public key into a flash memory for storage; generating first digest information according to target software information; making a signature for the first digest information, so as to obtain signature information; writing the signature information into the flash memory; and switching a security identifier of the eFuse from an insecure state to a secure state. It may be learned from the foregoing process that in this embodiment of the present invention, a security chip is not included, and security information configuration of an information system is implemented by a built-in SoC in a processor. Because no security chip needs to be used in this embodiment, costs of purchasing the security chip are reduced. In addition, when security configuration is being performed, only the flash memory and the SoC need to be configured, thereby simplifying a process of the security configuration. In addition, because the SoC responsible for security management is located in the processor, security information in the SoC, such as the private key, cannot be learned from outside the processor. After the security configuration is completed, the target software can be started only after the SoC performs the security verification on the target software. Therefore, compared with an external security chip in the prior art, the SoC provided in this embodiment of the present invention has higher security, thereby reducing a probability that an information system is cracked by an intruder.

For a better understanding of the foregoing embodiment, the following uses a specific application scenario of the foregoing embodiment as an example for description.

The SoC in the processor is connected to the flash memory outside the processor, so as to perform the security configuration. The SoC first generates a unique pair of keys: a public key and a private key, and writes the private key into the eFuse.

The SoC intercepts 32 least significant bits of the private key as the symmetric key, encrypts the public key, and writes the encrypted public key into the flash memory for storage.

The SoC obtains the target software information from the flash memory, and processes the target software information by using a unidirectional Hash function, so as to obtain the first digest information.

The SoC uses the private key to make a signature for the first digest information, so as to obtain the signature information, and writes the signature information into the flash memory.

The SoC includes a security identifier bit. The SoC rewrites the security identifier bit from 0 to 1, and then the target software can be started by the SoC only after the SoC performs the security verification on the target software.

Figure 4:
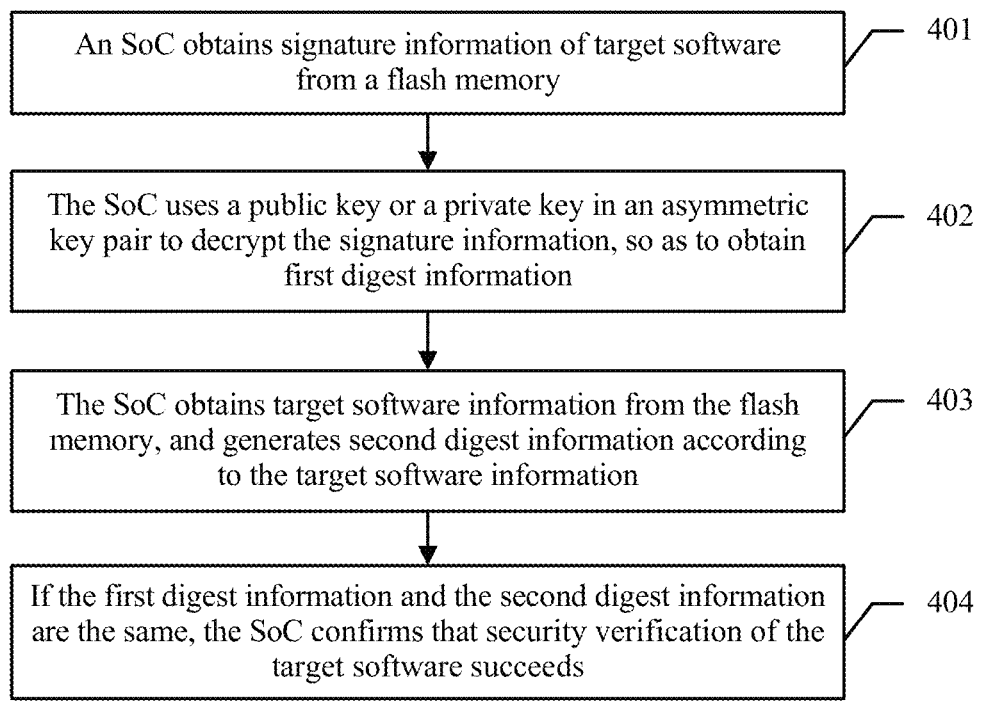
FIG. 4 is a flowchart of an embodiment of a security verification method according to an embodiment of the present invention.

The foregoing embodiment provides a basic security information configuration method provided in the present invention. After completing the security information configuration according to the foregoing method, an SoC may perform security verification when target software is being started. Therefore, an embodiment of the present invention further provides a related security verification method, so as to securely start the target software. Referring to FIG. 4, a basic process of the method includes the following steps.

401. An SoC obtains signature information of target software from a flash memory.

In this embodiment, a message digest method is used to ensure that target software information is not tampered with. A basic principle of the message digest method is as follows:

A digest corresponding to a character string may be obtained by processing the information by using a unidirectional Hash encryption function or another algorithm. A digest is unique, that is, digests corresponding to same messages are definitely the same, and digests corresponding to different messages are definitely different. Therefore, in this embodiment, the signature information of the target software is obtained from the flash memory; first digest information is obtained according to the signature information; and a second digest is generated according to target software information. It may be learned, by comparing whether the first digest and the second digest are the same, whether the target software information is tampered with within a time period from a moment at which the security information configuration is performed to a moment at which the target software is started.

Therefore, in this step, the SoC obtains the signature information of the target software from the flash memory.

402. The SoC uses a public key or a private key in an asymmetric key pair to decrypt the signature information, so as to obtain first digest information.

After obtaining the signature information of the target software, the SoC decrypts the signature information, so as to obtain the first digest information. The first digest information is a digest generated according to the target software information when the SoC performs the security information configuration.

The SoC includes an eFuse into which the private key in the asymmetric key pair is written. The SoC uses the public key or the private key in the asymmetric key pair to decrypt the signature information.

The SoC may use the public key or the private key in the asymmetric key pair to encrypt the signature information by using multiple methods. The methods mainly need to be corresponding to methods for encrypting the first digest information when the security information configuration is being performed, and details are described in the following embodiments. This is not limited in this embodiment.

After decrypting the signature information, the SoC may temporarily store the first digest information, so that the first digest information can be processed by the SoC. Specifically, the SoC may load the first digest information into an SRAM in the SoC for temporary storage, or load the first digest information into a DDR for temporary storage. This is not limited in this embodiment.

403. The SoC obtains target software information from the flash memory, and generates second digest information according to the target software information.

The SoC obtains the target software information from the flash memory, and generates the second digest according to the target software information. It may be understood that an algorithm for generating the second digest should be the same as an algorithm for generating the first digest during the security information configuration, so as to ensure that same digests can be generated according to same messages.

After obtaining the target software information from the flash memory, the SoC may temporarily store the target software information, so that the target software information can be processed by the SoC. Specifically, the SoC may load the target software information into the SRAM in the SoC for temporary storage, or load the target software information into the double data rate synchronous dynamic random access memory DDR for temporary storage. This is not limited in this embodiment. Step 403 may be performed before step 401 or 402. This is not limited in this embodiment.

404. If the first digest information and the second digest information are the same, the SoC confirms that security verification of the target software succeeds.

If the first digest information and the second digest information are the same, it indicates that the target software information is not tampered with within a time period from a moment at which the security information configuration is performed to a moment at which the target software is started, the SoC confirms that security verification of the target software succeeds, and the target software can be started.

In this embodiment, an SoC obtains signature information of target software from a flash memory; decrypts the signature information, so as to obtain first digest information; obtains target software information from the flash memory and generates second digest information according to the target software information; and if the first digest information and the second digest information are the same, confirms that security verification of the target software succeeds. It may be learned from the foregoing process that in this embodiment, a security chip is not included, and the security verification for the target software information is implemented by a built-in SoC in a processor. Because no security chip needs to be used in the embodiment of the present invention, costs of purchasing the security chip are reduced, and a process of security verification is simplified. In addition, because the SoC responsible for the security management is located in the processor, security information in the SoC, such as the private key, cannot be learned from outside the processor, and the signature information cannot be tampered with. Therefore, compared with an external security chip in the prior art, the SoC provided in this embodiment of the present invention has higher security, thereby reducing a probability that an information system is cracked by an intruder.

In step 402, when the SoC decrypts the signature information, a decryption method needs to be corresponding to a method for encrypting the first digest information during the security information configuration. For example, if the SoC uses the public key to make a signature for the first digest information when the security information configuration is being performed, in step 402, the SoC may use the private key to decrypt the signature information; or if the SoC uses the private key to make a signature for the first digest information when the security information configuration is being performed, in step 402, the SoC obtains the encrypted public key from the flash memory, decrypts the encrypted public key, so as to obtain the public key, and then uses the public key to decrypt the signature information. The SoC may also decrypt the signature information by using another method. This is not limited in this application.

If the SoC needs to decrypt the encrypted public key, the SoC may write the public key obtained by means of decryption into the SRAM or the DDR for temporary storage, so that the public key can be used by the SoC.

To improve security of an information system, when the security information configuration is being performed, the SoC may determine a symmetric key according to the private key, and encrypt the public key by using the symmetric key; when decrypting the encrypted public key, the SoC may use the symmetric key to perform decryption. Because the private key cannot be learned from outside the SoC, the symmetric key generated according to the private key may be learned only by the SoC, and cannot be cracked from outside the SoC, thereby improving security of the public key. Because the private key includes a very large quantity of bits, to simplify operations of encrypting and decrypting the public key and alleviate load on the SoC, the SoC may directly intercept a preset bit field of the private key as the symmetric key, for example, the SoC intercepts a preset least significant bit or a preset most significant bit of the private key; alternatively, the SoC may intercept a preset bit field of the private key by using another method. This is not limited herein. Certainly, the SoC may also generate, by using an exclusive OR algorithm or another algorithm, the symmetric key according to the private key. This is not limited in this application.

It may be understood that if in step 404, the first digest information and the second digest information are different, it indicates that the target software information is tampered with within a time period from a moment at which the security information configuration is performed to a moment at which the target software is started, and the SoC confirms that the security verification of the target software fails.

An existing SoC chip generally includes two modes: a secure world (Secure World) mode and a normal world (Normal World) mode. When being in the secure world mode, the SoC chip has a high security privilege, and a program running in the secure world cannot be modified from outside the SoC chip. Before performing the security verification, the SoC switches the system to the secure world, so as to ensure that information is not tampered with by an attacker outside the SoC during the security verification. After the SoC determines that the security verification of the target software succeeds, the SoC may switch the system from the secure world to the normal world, and run the target software in the normal world.

In actual application, a user may need to start multiple levels of target software to obtain a service. The SoC may implement security verification for the multiple levels of target software according to the method provided in this embodiment. For example, if a user intends to start a game "Fruit Slice" on a terminal, first-level target software, that is, a terminal underlying system, needs to be first started on the terminal; then second-level target software, that is, an Android operating system, is started by using the terminal underlying system; and finally third-level target software, that is, the game "Fruit Slice", is started by using the Android operating system. Therefore, when the security verification is being performed, the SoC in the terminal first obtains first digest information and second digest information that are of the terminal underlying system, and compares whether the first digest information and the second digest information are the same. If the first digest information and the second digest information are different, the SoC confirms that the security verification of the terminal underlying system fails. If the first digest information and the second digest information are the same, the SoC confirms that the security verification of the terminal underlying system succeeds, and the SoC starts the terminal underlying system by using a BootROM (BootRom), and performs the security verification on the Android operating system; by analogy, the process continues. The SoC can finally determine that security verification of a highest-level target software succeeds only when first digest information and second digest information that are of target software of each level are the same. If first digest information and second digest information that are of target software of any level are different, security verification does not need to be performed on target software of a next level, and the SoC directly determines that the security verification fails. This may prevent the target software information from being arbitrarily modified, thereby improving security of the information system.

For a better understanding of the foregoing embodiment, the following uses a specific application scenario of the foregoing embodiment as an example for description.

The SoC in the processor is connected to the flash memory outside the processor, and the security configuration is completed. At a specific moment, the SoC switches the system to the secure world mode, so as to perform the security verification on the target software.

After being started, the SoC obtains the signature information of the target software from the flash memory. The signature information is obtained after the SoC uses the private key to make a signature for the first digest information.

After being encrypted by using a specific algorithm according to the least significant bit of the private key corresponding to the public key, the public key is stored in the flash memory. The SoC obtains the encrypted public key from the flash memory, intercepts 32 least significant bits of the private key as the symmetric key, and decrypts the encrypted public key, so as to obtain the public key. The SoC uses the public key to decrypt the signature information, so as to obtain the first digest information.

The SoC obtains the target software information from the flash memory, and processes the target software information by using a unidirectional Hash function, so as to obtain the second digest information.

Because the first digest information and the second digest information are the same, it indicates that the target software information is not tampered with within a time period from a moment at which the security information configuration is performed to a moment at which the target software is started, and the SoC confirms that the security verification of the target software succeeds.

Figure 3:
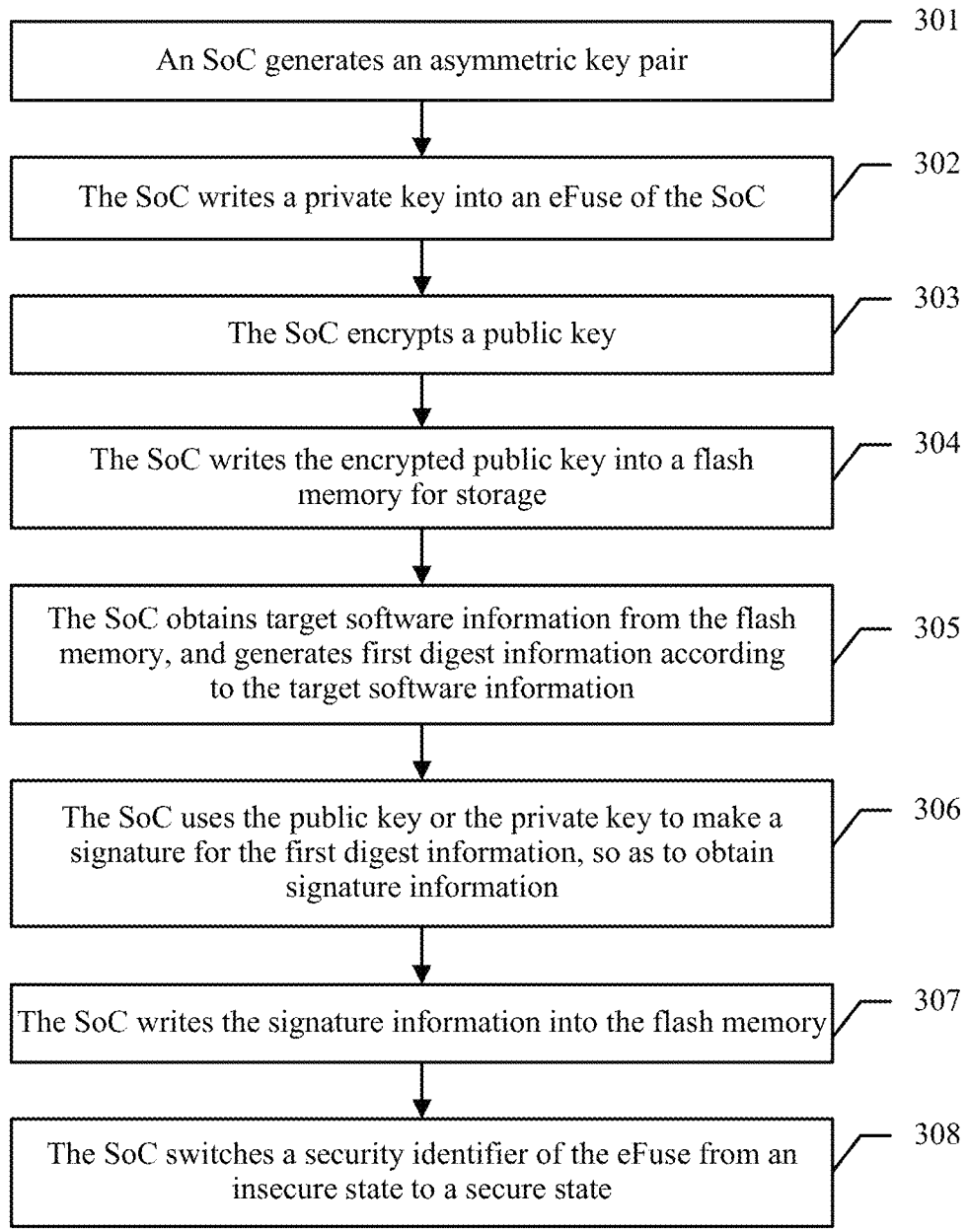
FIG. 3 is a flowchart of an embodiment of a security information configuration method according to an embodiment of the present invention.

An embodiment of the present invention further provides a related system on chip SoC, so as to implement a security information configuration method in an embodiment shown in FIG. 2 or FIG. 3. For a basic structure of the SoC, refer to FIG. 5. The SoC mainly includes:

a key generation module 501, configured to generate an asymmetric key pair, where the asymmetric key pair includes a public key and a private key;

a private key storage module 502, configured to write the private key into an electrically programmable fuse eFuse of the SoC;

a public key encryption module 503, configured to encrypt the public key;

a public key storage module 504, configured to write the encrypted public key into a flash memory for storage;

a first digest generation module 505, configured to obtain target software information from the flash memory, and generate first digest information according to the target software information, where the target software information is used to start target software;

a first digest signature module 506, configured to use the public key or the private key to make a signature for the first digest information, so as to obtain signature information; and a signature storage module 507, configured to write the signature information into the flash memory.

This embodiment provides an SoC, where: a key generation module 501 generates an asymmetric key pair; a private key storage module 502 writes a private key into an eFuse of the SoC; a public key encryption module 503 encrypts a public key; a public key storage module 504 writes the encrypted public key into a flash memory for storage; a first digest generation module 505 generates first digest information according to target software information; a first digest signature module 506 makes a signature for the first digest information, so as to obtain signature information; and a signature storage module 507 writes the signature information into the flash memory. It may be learned from the foregoing process that the SoC provided in this embodiment of the present invention can implement security information configuration without an additional security chip, so that costs of purchasing a security chip are reduced. In addition, according to the SoC provided in this application, when security configuration is being performed, only the flash memory and the SoC are configured, thereby simplifying a process of the security configuration. In addition, because the SoC responsible for security management is located in the processor, security information in the SoC, such as the private key, cannot be learned from outside the processor. Therefore, compared with an external security chip in the prior art, the SoC provided in this embodiment of the present invention has higher security, thereby reducing a probability that an information system is cracked by an intruder.

Because the first digest signature module 506 uses the public key or the private key to make a signature for the first digest information, so as to obtain the signature information, the first digest signature module 506 may be connected to the private key storage module 502, and/or connected to the public key storage module 504.

Figure 5:
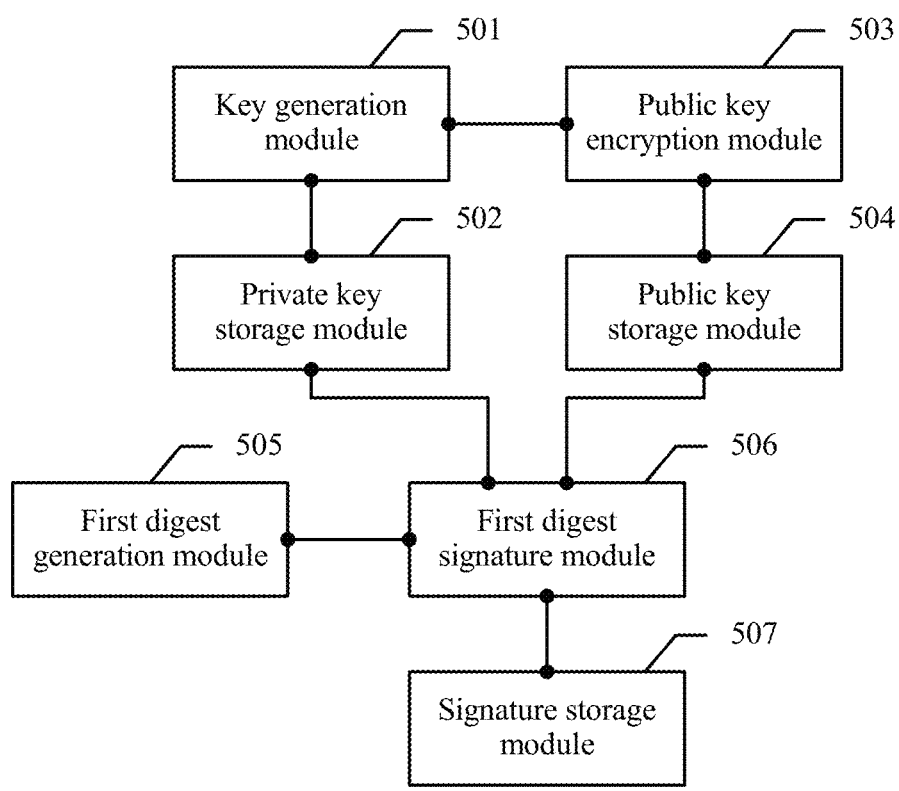
FIG. 5 is a structural diagram of an embodiment of an SoC according to an embodiment of the present invention.
Figure 6:
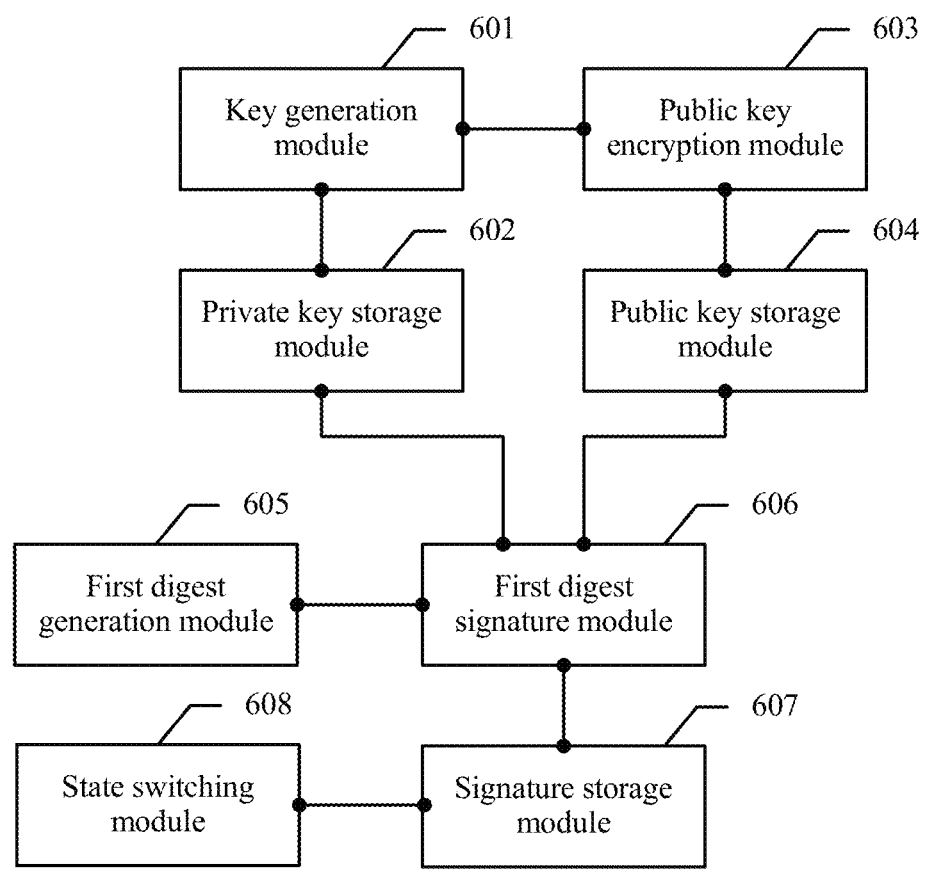
FIG. 6 is a structural diagram of an embodiment of an SoC according to an embodiment of the present invention.

An embodiment shown in FIG. 5 provides a basic structure of the SoC provided in this embodiment of the present invention. The following embodiment provides a more detailed SoC. For a basic structure of the SoC, refer to FIG. 6, the SoC mainly includes: a key generation module 601, a private key storage module 602, a public key encryption module 603, a public key storage module 604, a first digest generation module 605, a first digest signature module 606, and a signature storage module 607.

The key generation module 601 is configured to generate an asymmetric key pair, where the asymmetric key pair includes a public key and a private key.

The private key storage module 602 is configured to write the private key into an electrically programmable fuse eFuse of the SoC.

The public key encryption module 603 is configured to encrypt the public key.

The public key encryption module may be specifically configured to: determine a symmetric key according to the private key, and encrypt the public key by using the symmetric key.

The public key encryption module may intercept a preset bit field of the private key as the symmetric key, so as to encrypt the public key.

The public key storage module 604 is configured to write the encrypted public key into a flash memory for storage.

The first digest generation module 605 is configured to obtain target software information from the flash memory, and generate first digest information according to the target software information, where the target software information is used to start target software.

The first digest signature module 606 is configured to use the public key or the private key to make a signature for the first digest information, so as to obtain signature information.

The first digest signature module may be configured to: obtain the encrypted public key from the flash memory; decrypt the encrypted public key, so as to obtain the public key; and use the public key to make a signature for the first digest information; or the first digest signature module may be configured to use the private key to make a signature for the first digest information.

The signature storage module 607 is configured to write the signature information into the flash memory.

The eFuse includes a security identifier. The security identifier includes two statuses: a secure state and an insecure state, and is used to control a manner of starting the target software. If the security identifier indicates the insecure state, the manner of starting the target software is: direct starting; or if the security identifier indicates the secure state, the manner of starting the target software is: starting after the SoC performs security verification on the target software. The SoC in this embodiment further includes:

a state switching module 608, configured to switch the security identifier of the eFuse from the insecure state to the secure state.

This embodiment provides an SoC, where: a key generation module 601 generates an asymmetric key pair; a private key storage module 602 writes a private key into an eFuse of the SoC; a public key encryption module 603 encrypts a public key; a public key storage module 604 writes the encrypted public key into a flash memory for storage; a first digest generation module 605 generates first digest information according to target software information; a first digest signature module 606 makes a signature for the first digest information, so as to obtain signature information; and a signature storage module 607 writes the signature information into the flash memory. It may be learned from the foregoing process that the SoC provided in this embodiment of the present invention can implement security information configuration without an additional security chip, so that costs of purchasing a security chip are reduced. In addition, according to the SoC provided in this application, when security configuration is being performed, only the flash memory and the SoC are configured, thereby simplifying a process of the security configuration. In addition, because the SoC responsible for security management is located in the processor, security information in the SoC, such as the private key, cannot be learned from outside the processor. After the security configuration is completed, a state switching module 608 switches a security identifier of the eFuse from an insecure state to a secure state, and target software can be started only after the SoC performs the security verification on the target software. Therefore, compared with an external security chip in the prior art, the SoC provided in this embodiment of the present invention has higher security, thereby reducing a probability that an information system is cracked by an intruder.

For a better understanding of the foregoing embodiment, the following uses a specific application scenario of the foregoing embodiment as an example for description.

The SoC in the processor is connected to the flash memory outside the processor, so as to perform the security configuration. The key generation module 601 first generates a unique pair of keys: a public key and a private key. The private key storage module 602 writes the private key into the eFuse.

The public key encryption module 603 intercepts 32 least significant bits of the private key as the symmetric key, and encrypts the public key. The public key storage module 604 writes the encrypted public key into the flash memory for storage.

The first digest generation module 605 obtains the target software information from the flash memory, and processes the target software information by using a unidirectional Hash function, so as to obtain the first digest information.

The first digest signature module 606 uses the private key to make a signature for the first digest information, so as to obtain the signature information. The signature storage module 607 writes the signature information into the flash memory.

The SoC includes a security identifier bit. After the state switching module 608 rewrites the security identifier bit from 0 to 1, the target software can be started by the SoC only after the SoC performs the security verification on the target software.

Figure 7:
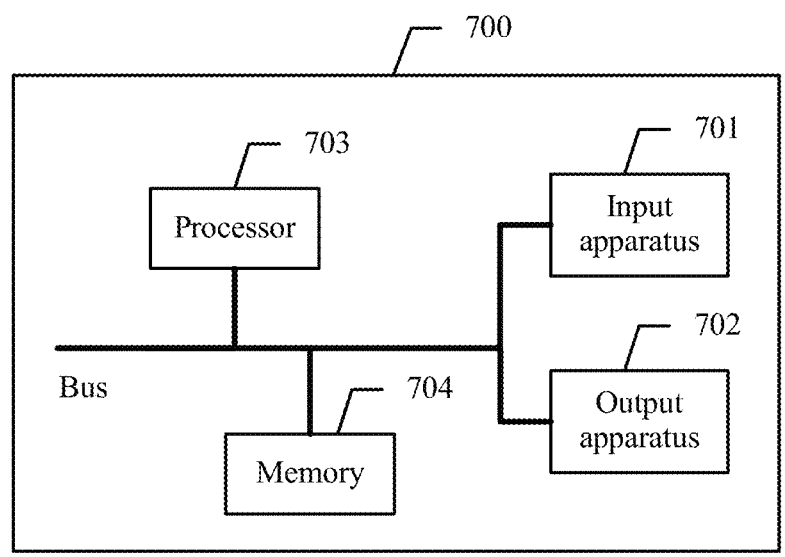
FIG. 7 is a structural diagram of an embodiment of an SoC according to an embodiment of the present invention.

The foregoing describes the SoC in the embodiments of the present invention from a perspective of a unitized function entity, and the following describes the SoC in the embodiments of the present invention from a perspective of hardware processing. Referring to FIG. 7, another embodiment of an SoC 700 in an embodiment of the present invention includes:

an input apparatus 701, an output apparatus 702, a processor 703, and a memory 704 (the SoC 700 may include one or more processors 703, and one processor 703 is used as an example in FIG. 7). In some embodiments of the present invention, the input apparatus 701, the output apparatus 702, the processor 703, and the memory 704 may be connected by using a bus or in another manner. In FIG. 7, a bus connection is used as an example.

The processor 703 is configured to perform, by invoking an operation instruction stored in the memory 704, the following steps:

generating an asymmetric key pair, where the asymmetric key pair includes a public key and a private key; writing the private key into an electrically programmable fuse eFuse of the SoC; encrypting the public key; writing the encrypted public key into a flash memory for storage; obtaining target software information from the flash memory, and generating first digest information according to the target software information, where the target software information is used to start target software; using the public key or the private key to make a signature for the first digest information, so as to obtain signature information; and writing the signature information into the flash memory.

In some embodiments of the present invention, the processor 703 is further configured to perform the following steps: obtaining the encrypted public key from the flash memory; decrypting the encrypted public key, so as to obtain the public key; and using the public key to make a signature for the first digest information; or using the private key to make a signature for the first digest information.

In some embodiments of the present invention, the processor 703 is further configured to perform the following step: switching a security identifier of the eFuse from an insecure state to a secure state.

In some embodiments of the present invention, the processor 703 is further configured to perform the following steps: determining a symmetric key according to the private key, and encrypting the public key by using the symmetric key.

In some embodiments of the present invention, the processor 703 is further configured to perform the following step: intercepting, by the public key encryption module, a preset bit field of the private key as the symmetric key.

Figure 8:
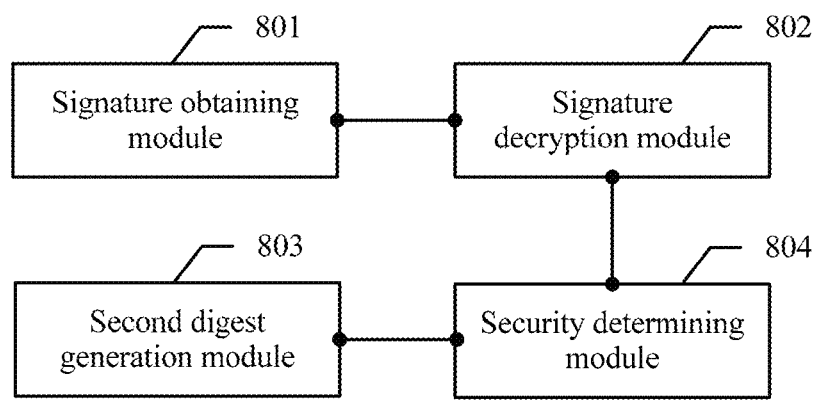
FIG. 8 is a structural diagram of an embodiment of an SoC according to an embodiment of the present invention.

An embodiment of the present invention further provides a related system on chip SoC. The SoC includes an eFuse into which a private key in an asymmetric key pair is written, so as to implement a security verification method in an embodiment shown in FIG. 4. For a basic structure of the SoC, refer to FIG. 8. The SoC mainly includes:

a signature obtaining module 801, configured to obtain signature information of target software information from a flash memory;

a signature decryption module 802, configured to use a public key or the private key in the asymmetric key pair to decrypt the signature information, so as to obtain first digest information;

a second digest generation module 803, configured to obtain the target software information from the flash memory, and generate second digest information according to the target software information; and a security determining module 804, configured to: when the first digest information and the second digest information are the same, confirm that security verification of target software succeeds.

In this embodiment, a signature obtaining module 801 obtains signature information of target software from a flash memory; a signature decryption module 802 decrypts the signature information, so as to obtain first digest information; a second digest generation module 803 obtains target software information from the flash memory, and generates second digest information according to the target software information; and if the first digest information and the second digest information are the same, a security determining module 804 confirms that the security verification of the target software succeeds. It may be learned from the foregoing process that the SoC provided in this embodiment can implement security verification without an additional security chip, so that costs of purchasing a security chip are reduced, and a process of the security verification is simplified. In addition, because the SoC is located in the processor, security information in the SoC, such as the private key, cannot be learned from outside the processor, and the signature information cannot be tampered with. Therefore, compared with an external security chip in the prior art, the SoC provided in this embodiment of the present invention has higher security during the security verification, thereby reducing a probability that an information system is cracked by an intruder.

The signature decryption module 802 may be specifically configured to: use the private key to decrypt the signature information; or obtain the encrypted public key in the asymmetric key pair from the flash memory, decrypt the encrypted public key, so as to obtain the public key, and use the public key to decrypt the signature information.

The signature decryption module 802 may be specifically configured to: determine a symmetric key according to the private key, and decrypt the encrypted public key by using the symmetric key.

The signature decryption module 802 may specifically intercept a preset bit field of the private key as the symmetric key.

For a better understanding of the foregoing embodiment, the following uses a specific application scenario of the foregoing embodiment as an example for description.

The SoC in the processor is connected to the flash memory outside the processor, and the security configuration is completed. At a specific moment, the SoC switches the system to the secure world mode, so as to perform the security verification on the target software.

After the SoC is started, the signature obtaining module 801 obtains the signature information of the target software from the flash memory. The signature information is obtained after the SoC uses the private key to make a signature for the first digest information.

After being encrypted by using a specific algorithm according to the least significant bit of the private key corresponding to the public key, the public key is stored in the flash memory. The signature decryption module 802 obtains the encrypted public key from the flash memory, intercepts 32 least significant bits of the private key as the symmetric key, and decrypts the encrypted public key, so as to obtain the public key. The SoC uses the public key to decrypt the signature information, so as to obtain the first digest information.

The second digest generation module 803 obtains the target software information from the flash memory, and processes the target software information by using a unidirectional Hash function, so as to obtain the second digest information.

Because the first digest information and the second digest information are the same, it indicates that the target software information is not tampered with within a time period from a moment at which the security information configuration is performed to a moment at which the target software is started, and the security determining module 804 confirms that the security verification of the target software succeeds.

The foregoing describes the SoC in the embodiments of the present invention from a perspective of a unitized function entity, and the following describes the SoC in the embodiments of the present invention from a perspective of hardware processing. Still referring to FIG. 7, another embodiment of an SoC 700 in embodiments of the present invention includes:

an input apparatus 701, an output apparatus 702, a processor 703, and a memory 704 (the SoC 700 may include one or more processors 703, and one processor 703 is used as an example in FIG. 7). In some embodiments of the present invention, the input apparatus 701, the output apparatus 702, the processor 703, and the memory 704 may be connected by using a bus or in another manner. In FIG. 7, a bus connection is used as an example.

The processor 703 is configured to perform, by invoking an operation instruction stored in the memory 704, the following steps:

obtaining signature information of target software information from the flash memory; decrypting the signature information, so as to obtain first digest information; obtaining the target software information from the flash memory, and generating second digest information according to the target software information; and when the first digest information and the second digest information are the same, confirming that security verification of target software succeeds.

In some embodiments of the present invention, the processor 703 is further configured to perform the following steps: using the private key to decrypt the signature information; or obtaining the encrypted public key in the asymmetric key pair from the flash memory, decrypting the encrypted public key, so as to obtain the public key, and using the public key to decrypt the signature information.

In some embodiments of the present invention, the processor 703 is further configured to perform the following steps: determining a symmetric key according to the private key, and decrypting the encrypted public key by using the symmetric key.

In some embodiments of the present invention, the processor 703 is further configured to perform the following step: intercepting a preset bit field of the private key as the symmetric key.

It may be clearly understood by a person skilled in the art that, for the purpose of convenient and brief description, for a detailed working process of the foregoing system, module, and unit, reference may be made to a corresponding process in the foregoing method embodiments, and details are not described herein.

In the several embodiments provided in this application, it should be understood that the disclosed system and method may be implemented in other manners. For example, the described system embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A security information configuration method, comprising:
    generating, by a system on chip (SoC), an asymmetric key pair comprising a public key and a private key;
    writing, by the SoC, the private key into an electrically programmable fuse (eFuse) of the SoC;
    encrypting, by the SoC, the public key;
    writing, by the SoC, the encrypted public key into a flash memory for storage;
    obtaining, by the SoC, target software information from the flash memory, and generating first digest information according to the target software information, wherein the target software information is for starting target software;
    using, by the SoC, the public key or the private key to make a signature for the first digest information, so as to obtain signature information; and
    writing, by the SoC, the signature information into the flash memory.

2. The security information configuration method according to claim 1, wherein using, by the SoC, the public key or the private key to make a signature for the first digest information comprises:
    obtaining, by the SoC, the encrypted public key from the flash memory;
    decrypting, by the SoC, the encrypted public key, so as to obtain the public key; and
    using, by the SoC, the public key to make a signature for the first digest information.

3. The security information configuration method according to claim 1, wherein:
    the eFuse comprises a security identifier for indicating two states that include a secure state and an insecure state, and the security identifier is for controlling a manner of starting the target software, wherein if the security identifier indicates the insecure state, the manner of starting the target software comprises direct starting, or if the security identifier indicates the secure state, the manner of starting the target software comprises starting after the SoC performs security verification on the target software; and
    after writing, by the SoC, the signature information into the flash memory, the method further comprises:
        switching, by the SoC, the security identifier of the eFuse from the insecure state to the secure state.

4. The security information configuration method according to claim 1, wherein encrypting, by the SoC, the public key comprises:
    determining, by the SoC, a symmetric key according to the private key, and encrypting the public key by using the symmetric key.

5. The security information configuration method according to claim 4, wherein determining, by the SoC, a symmetric key according to the private key comprises:
    intercepting, by the SoC, a preset bit field of the private key as the symmetric key.

6. A system on chip (SoC), comprising:
    an input apparatus, an output apparatus, a processor, and a memory; and
    a processor configured to:
        generate an asymmetric key pair comprising a public key and a private key,
        write the private key into an electrically programmable fuse (eFuse) of the SoC,
        encrypt the public key,
        write the encrypted public key into a flash memory for storage,
        obtain target software information from the flash memory, and generate first digest information according to the target software information, wherein the target software information is for starting target software,
        use the public key or the private key to make a signature for the first digest information, so as to obtain signature information, and
        write the signature information into the flash memory.

7. The SoC according to claim 6, wherein the processor is configured to:
    obtain the encrypted public key from the flash memory;
    decrypt the encrypted public key, so as to obtain the public key; and
    use the public key to make a signature for the first digest information.

8. The SoC according to claim 6, wherein:
    the eFuse comprises a security identifier for indicating two states that include a secure state and an insecure state, and the security identifier is for controlling a manner of starting the target software, wherein if the security identifier indicates the insecure state, the manner of starting the target software comprises direct starting, or if the security identifier indicates the secure state, the manner of starting the target software comprises starting after the SoC perform is security verification on the target software; and
    the processor is further configured to:
        switch the security identifier of the eFuse from the insecure state to the secure state.

9. The SoC according to claim 6, wherein the processor is configured to:
    determine a symmetric key according to the private key, and encrypt the public key by using the symmetric key.

10. The SoC according to claim 9, wherein the processor is configured to:
    intercept a preset bit field of the private key as the symmetric key.

11. A system on chip (SoC), comprising:
    an input apparatus, an output apparatus, a processor, a memory, and an electrically programmable fuse (eFuse) into which a private key in an asymmetric key pair is written; and
    a processor configured to:
        obtain signature information of target software information from a flash memory,
        obtain an encrypted public key in the asymmetric key pair from the flash memory,
        decrypt the encrypted public key, so as to obtain a public key,
        use the public key or the private key in the asymmetric key pair to decrypt the signature information, so as to obtain first digest information, obtain the target software information from the flash memory, and generate second digest information according to the target software information, and if the first digest information and the second digest information are the same, confirm that security verification of target software associated with the target software information succeeds.

12. The SoC according to claim 11, wherein the processor is configured to:

use the public key to decrypt the signature information.

13. The SoC according to claim 12, wherein the processor is configured to:

determine a symmetric key according to the private key, and decrypt the encrypted public key by using the symmetric key.

14. The SoC according to claim 13, wherein the processor is configured to:

intercept a preset bit field of the private key as the symmetric key.

* * * * *